SENSE LINE CAPACITIVE BALANCING IN WORD-ORGANIZED MEMORY ARRAYS

Filed Feb. 27, 1963 5 Sheets-Sheet 1

INVENTOR.
CONCETTO P. ITALIA
BY Robert Lieber
ATTORNEY

SENSE LINE CAPACITIVE BALANCING IN WORD-ORGANIZED MEMORY ARRAYS

Filed Feb. 27, 1963 5 Sheets-Sheet 2

INVENTOR.
CONCETTO P. ITALIA
BY Robert Lieber
ATTORNEY

SENSE LINE CAPACITIVE BALANCING IN WORD-ORGANIZED MEMORY ARRAYS

Filed Feb. 27, 1963 5 Sheets-Sheet 3

INVENTOR.
CONCETTO P. ITALIA
BY Robert Lieber
ATTORNEY

June 13, 1967 C. P. ITALIA 3,325,791

SENSE LINE CAPACITIVE BALANCING IN WORD-ORGANIZED MEMORY ARRAYS

Filed Feb. 27, 1963 5 Sheets-Sheet 4

INVENTOR.
CONCETTO P. ITALIA
BY Robert Lieber
ATTORNEY

SENSE LINE CAPACITIVE BALANCING IN WORD-ORGANIZED MEMORY ARRAYS

Filed Feb. 27, 1963 5 Sheets-Sheet 5

INVENTOR.
CONCETTO P. ITALIA
BY Robert Lieber
ATTORNEY 3,325,791

SENSE LINE CAPACITIVE BALANCING IN WORD-ORGANIZED MEMORY ARRAYS

Concetto P. Italia, Linden, N.J., assignor to International Telephone and Telegraph Corporation, Nutley, N.J., a corporation of Maryland Filed Feb. 27, 1963, Ser. No. 261,259
2 Claims. (Cl. 340—174)

This invention generally concerns static arrays of bistable elements for storage of information.

Such static arrays are broadly classifiable as word-organized or coincident-organized, depending on the arrangement of selection wires employed therein for exciting the bistable storage elements of the array during read-out of intelligence therefrom. If only a single selection wire is required to be excited for interrogation of an entire word-group of storage elements, the memory array is termed "word-organized." As the word-groups in such arrays are usually arranged in a common line, or row, this type of organization is sometimes also designated "linear-select." On the other hand, if two, or more selection wires are required to be simultaneously marked during interrogation of an element, or of a word-group of elements, the array is termed coincident-organized, or bit-organized.

The foregoing classification of storage arrays is extensively treated in an article by J. A. Rajchman entitled, "Computer Memories—A Survey of the State-of-the-Art," on pages 104–127 of the IRE Proceedings, January 1961 issue. To avoid unnecessary repetition of well-known facts, liberal reference to this publication will be made throughout the present disclosure.

The Rajchman publication makes it clear that in both the word-organized and the bit-organized systems, the sense wires which transfer intelligence signals out of the array are usually balanced with respect to the memory elements of the array, so that extraneous signals coupled to a sense wire by extraneously excited (e.g. partially selected) memory elements are of a polarity such that they tend to cancel each other in the sense wire leaving an unbalanced output signal on the sense wire which is supposed to be truly representative of the state of the selected memory element.

An effect not considered troublesome in small arrays, involves the unbalanced coupling of extraneous signals to the sense wires due to capacitive coupling between certain selection and sense wires of the array. In small memory arrays (e.g. on the order of 64 words; each having 16 bits) the extraneous capacitive coupling which is the subject of this invention, is so small in amplitude relative to the unbalanced signals produced by extraneously excited memory elements that the capacitively coupled signals usually go unnoticed. Also significant is the fact that the unusual sense wire wiring patterns employed in some coincident-organized memories (see e.g. FIGURES 4*a* and 9 in the Rajchman publication) for cancelling extraneous coupling from the storage elements, also tend to nullify all other unbalanced extraneously coupled signals, although this last aspect appears to be coincidental, having not been treated in the literature or otherwise recognized as being significant.

I have noted, however, that in developing a large-scale word-organized storage array—e.g. on the order of 4,096 words, each 16 bits in length—using hitherto standard wiring patterns for the selection and sense wires, the magnitudes of the unbalanced extraneously coupled signals, due to capacitive coupling between wires, are apt to exceed those due to sensed intelligence, thereby introducing considerable uncertainty or, as will be clear from the discussion below, delay into the read-out process.

To eliminate such undesirable capacitive coupling in word-organized arrays, I have analyzed the major factors responsible therefore and by altering the relative wiring patterns of the selection and sense wires while maintaining a balanced magnetic symmetry of the sense wires relative to the storage elements of the array (to ensure cancellation of extraneous signals due to extraneously excited storage elements), I have managed to reduce the unbalanced capacitive coupling of extraneous signals to negligible levels, relative to the output attributable to sensed intelligence signals.

Accordingly, an object of my invention is to provide a word-organized static memory array in which the selection wires and the sense wires are disposed in predetermined relative patterns such that extraneous signals coupled directly from an excited selection wire to a sense wire, by virtue of capacitive coupling between said wires, are equally distributed between symmetrical halves of the sense wire, and are thereby effectively balanced relative to the amplifier circuits which are fed by the sense wire.

A specific object is to provide a word-organized memory array in which the relative wiring sequences of the digit selection wires and the corresponding sense wires—which wires are ordinarily coupled to the same storage elements of the array in closely coupled parallel paths—are altered so as to cause balanced, or approximately balanced, distribution of capacitively coupled extraneous signals to the sense wire, in connection with the application of a partial write selection signal to the corresponding digit selection wire during an information "writing" interval. By this means, the recovery time which must otherwise be allowed to permit unbalanced extraneously coupled write signals to subside, is eliminated, and a shortened write-read cycle is made possible.

Another specific object of this invention is to provide a word-organized static memory array, including multiple connections between word selection wires for convenient and economical selection of word groups of storage elements of the array, in which the effects of extraneous signals—due to capacitive coupling between the sense wires and the selection wires, via the said multiple connections—are balanced out by rearranging the multiple connections.

Another specific object is to provide a word-organized array of bistable storage elements wherein to each word-group of storage elements there is individually coupled a corresponding word-selection wire and switching element, and wherein the effects of extraneous coupling between the word selection wires and sense wires—due to partial selection of switching elements—are balanced out by means of a systematic permutation of the positional coupling of said selection wires.

In accordance with one of the above objects I provide an array of bistable storage elements arranged for single line read out selection in word groups, with a plurality of digit "write" selection wires disposed transverse to the lines defined by the storage element word groups, each digit selection wire being coupled to one digit storage element in each word-group. In standard wiring practice the digit selection and sense wires are coupled to the same storage elements, in identical, or almost identical sequences, as a result of which extraneous signals are capacitively coupled, during the write portion of a memory cycle, between proximate digit selection and sense wires. Thus the "read" portion of the same memory cycle must be postponed to permit unbalanced transients, due to extraneous "write signal" coupling, to subside. In order to avoid such undue prolongation of the "write" phase of the memory cycle, the effects associated with the direct capacitive coupling of extraneous signals are nullified by rearranging the relative sequences in which corresponding digit selection and sense wires are coupled to their associated digit storage elements, taking into consideration the attenuation of a selection signal due to the significant length, and therefore the significant resistance and inductance, of the digit selection and sense wires, in arriving at an appropriately compensatory relative pattern or digit selection and sense wires.

In accordance with another of the above objects, in an array of bistable storage elements arranged for single line read-out selection in word groups, and including a sense wire arranged for redistributed coupling of extraneous digit excitation signals, as noted above, as well as the usual plurality of word-selection wires individually coupled to the word-groups of storage elements of the array, in order to provide convenient access to any word selection wire, the word selection wires are organized into sub-sets, each of which is connected in multiple to an associated selection switch. The switch assigned to each sub-set functions to complete a circuit path for each of the selection wires in the sub-set. In order to achieve a balance of extraneous capacitive coupling to the transversely disposed sense wires due to such multiple connections it has been found expedient to systematically rearrange the wires assigned to each multiple connection, again in accordance with the basic teachings of this invention.

Finally, in accordance with still another object of the invention as noted above, in a word-organized array in which there is separate word selection means assigned to each word-group, I provide a systematically permuted coupling, between the word selection means and the associated word groups of storage elements, relative to the natural positional order of said means relative to said elements, so as to substantially nullify the effects of extraneous coupling to the sense wires which is attributable to partial excitation of a plurality of said selection means during selection of one of said means.

These and other objects of my invention may be more fully understood and appreciated from the following detailed description to be read in connection with the accompanying drawings wherein.

Figure 2:
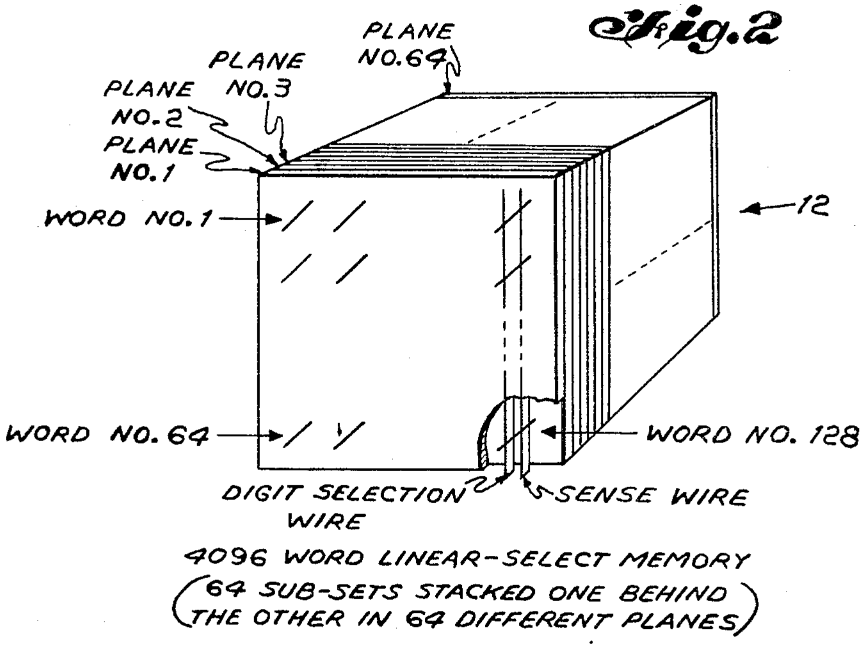
FIGURE 2 is a schematic drawing in perspective of the memory array of FIGURE 1 in which the word-groups are organized into planar sub-sets for convenient wiring and efficient packaging.
Figure 3:
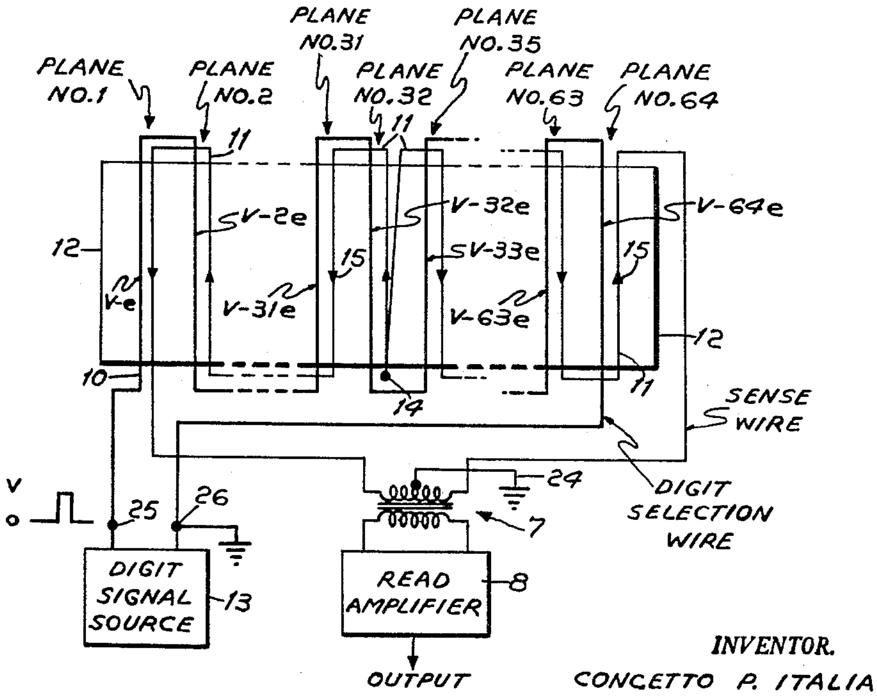
Figures 4, 5:
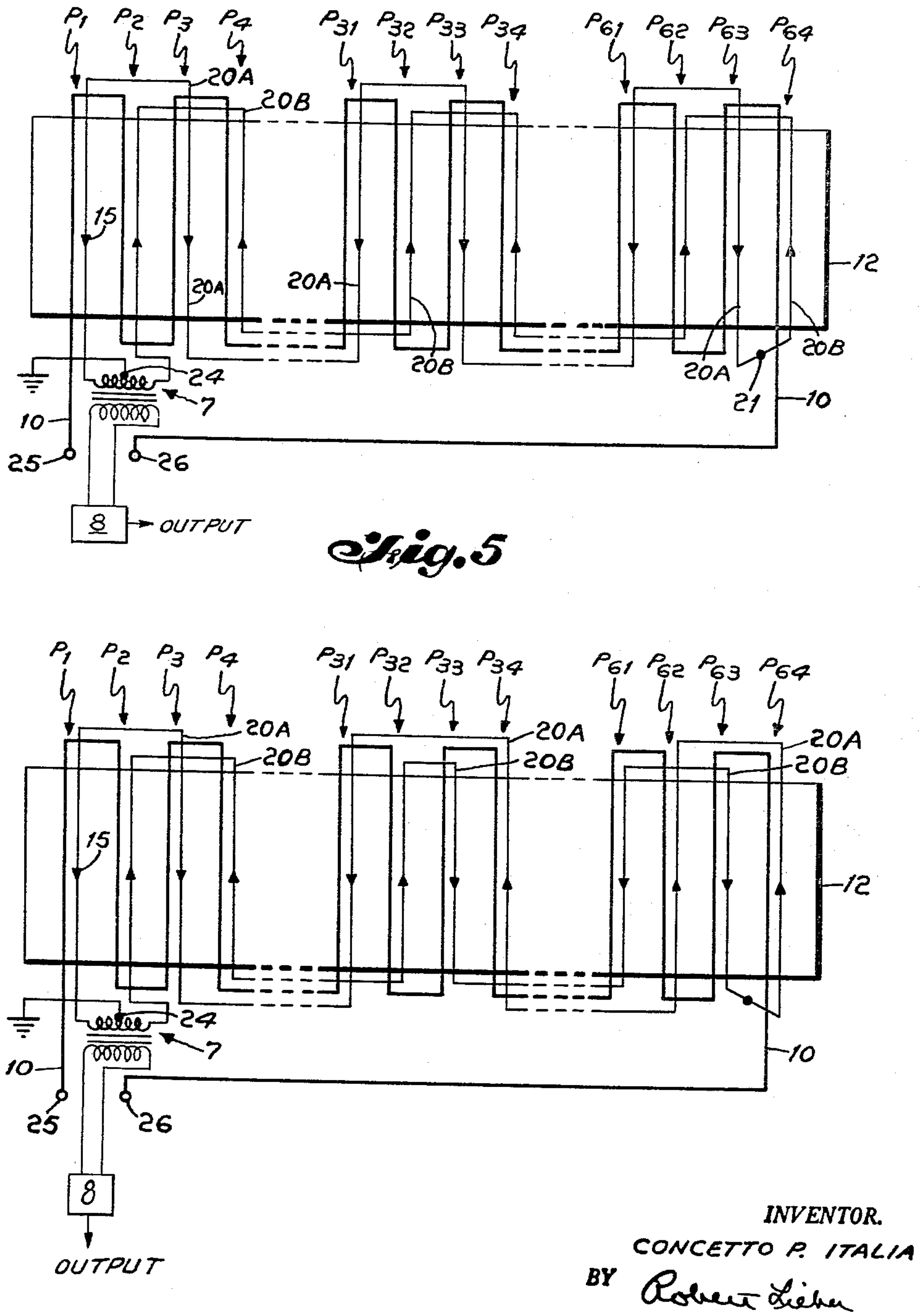
Figures 6, 7, 8:
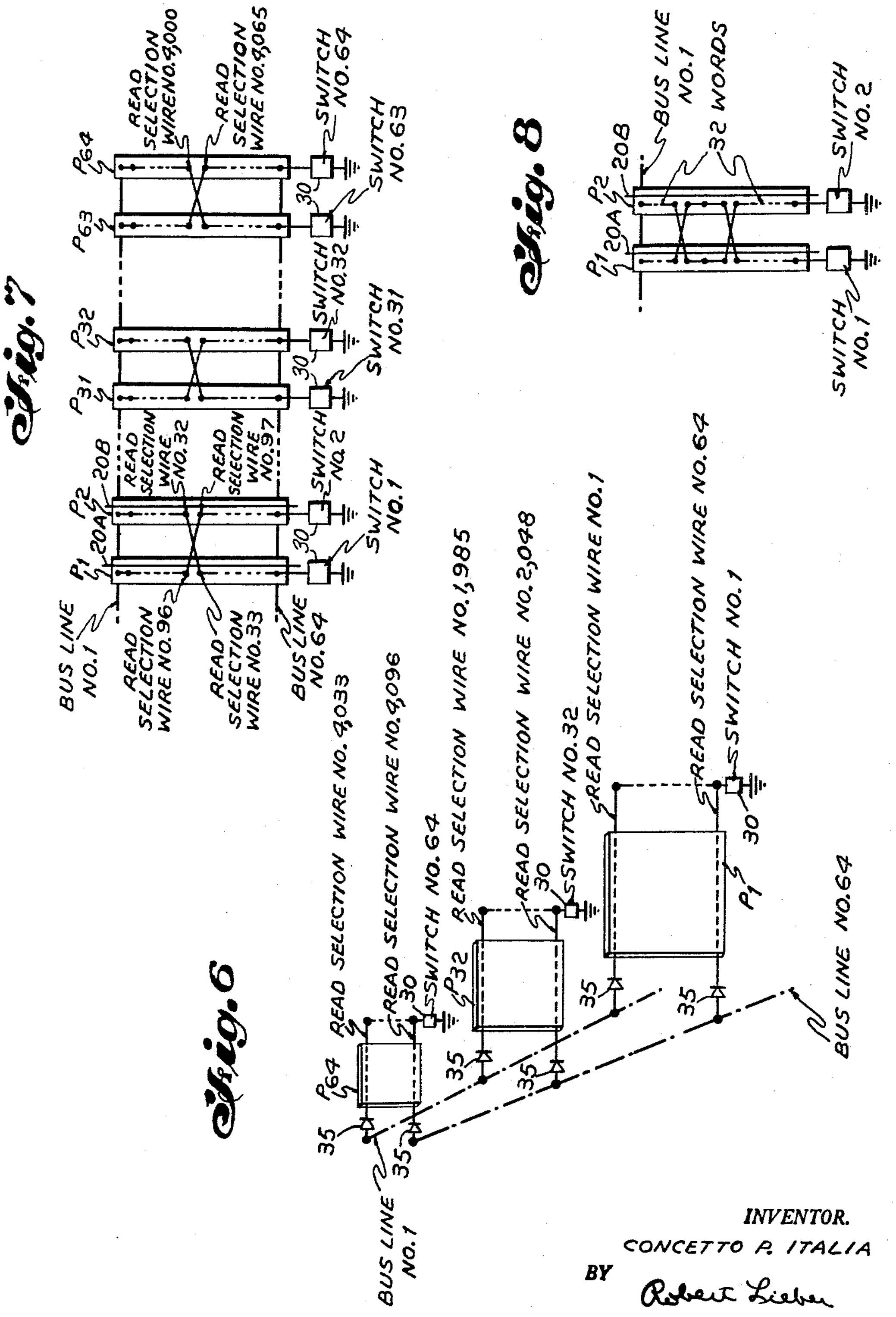
Figures 9, 10, 11:
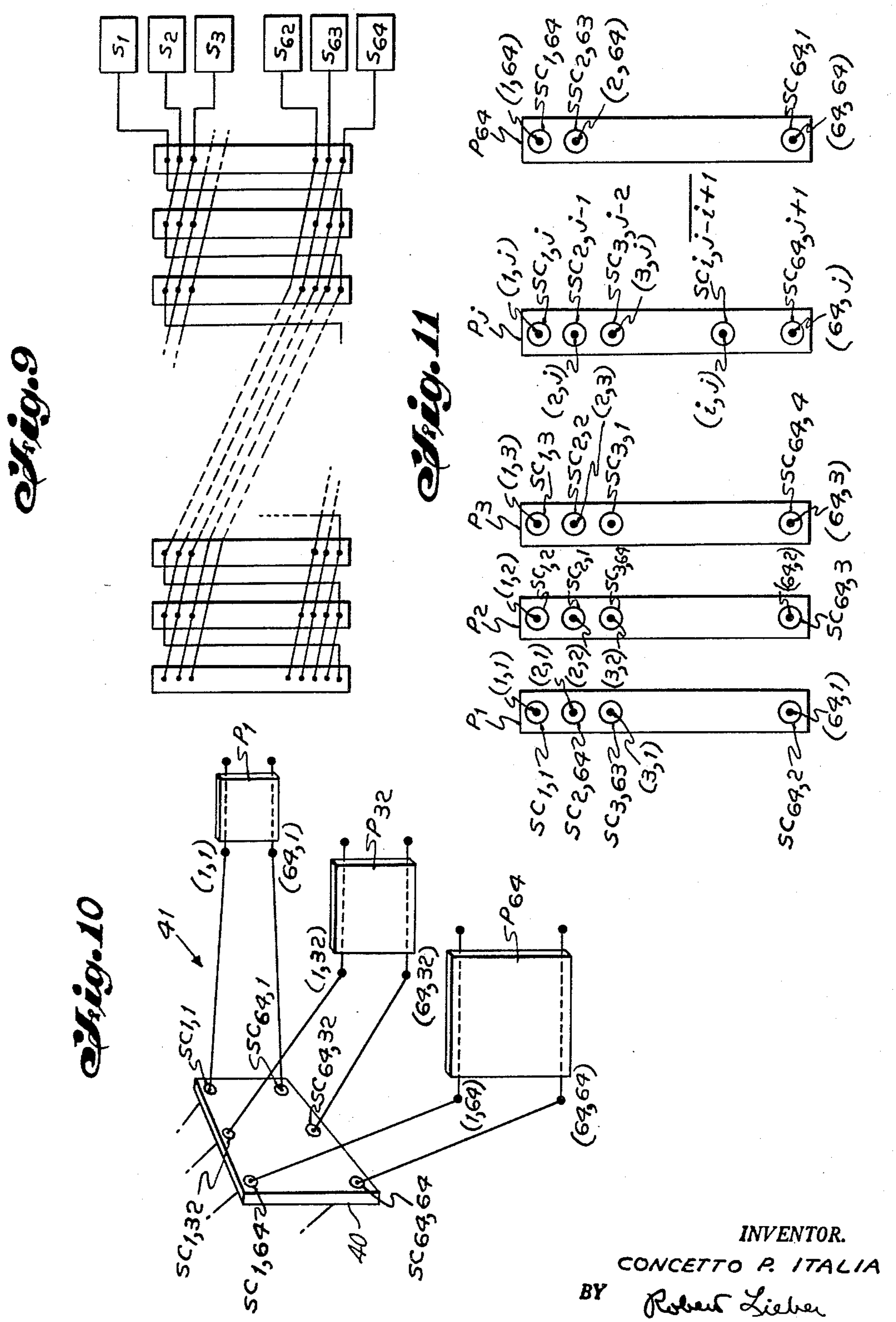

FIGURE 3 is a side view of an array, similar to that in FIGURE 2, illustrating a simple prior art rearrangement of the sense wire coupling pattern for cancelling the effects of extraneous signals due to magnetic coupling between an excited digit selection wire and a corresponding sense wire, and also due to magnetic coupling from the associated storage elements which are extraneously excited by the digit selection excitation;

FIGURE 4 is a side view of an array similar to that in FIGURE 3, but illustrating an intermediate wiring configuration for achieving cancellation of magnetically coupled extraneous signals;

FIGURE 5 is a side view, illustrating a refinement in accordance with this invention, of the wiring pattern of FIGURE 4, for the purpose of balancing out extraneous signals due to capacitive coupling between the digit selection and sense wires;

FIGURE 6 is a view in perspective of a word-organized memory array schematically illustrating the standard placement of word selection wires relative to the array, and further illustrating standard connections of word selection wires in multiple sets for the purpose of simplifying the access circuitry associated with the array;

FIGURE 7 is a side view of an array similar to the one shown in FIGURE 6, schematically illustrating a systematic rearrangement of the multiple connections between word selection wires for the purpose of redistributing the associated direct coupling of extraneous signals, relative to transverse sense wires arranged as in FIGURE 4 or 5;

FIGURE 8 is a side view similar to that in FIGURE 7 schematically illustrating an alternative rearrangement of multiple connections in accordance with the present invention;

FIGURE 9 illustrates still another alternative rearrangement of the multiple connections shown in FIGURE 7;

FIGURE 10 is a schematic view in perspective of a word-organized memory array having associated therewith a corresponding array of magnetic switching cores, one for each word group of the storage array, and a corresponding array of word selection wires coupled between corresponding switch cores and storage word groups.

FIGURE 11 is a side view of an array corresponding to the array in FIGURE 9 which schematically illustrates a systematic rearrangement of the correspondence between switch cores and storage word groups therein in accordance with the teachings of the present invention.

Figure 1:
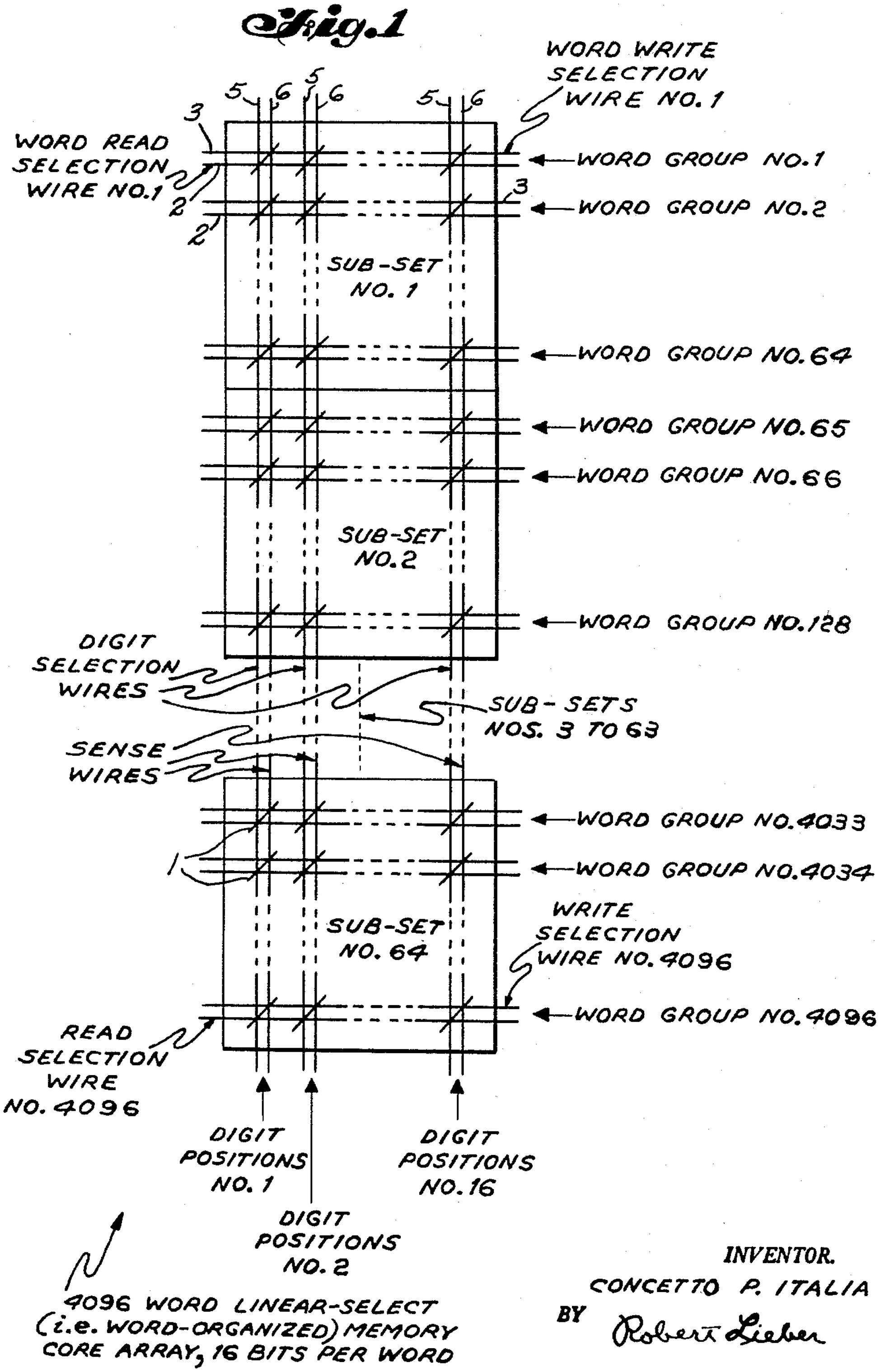
FIGURE 1 is a schematic drawing of a large scale word-organized memory array containing 4,096 word groups, each having 16 storage elements, with the entire array arranged in a single plane.

FIGURE 1 shows a large scale word-organized array of bistable storage elements, which, in the particular instance, are shown as magnetic cores 1. The cores are organized into 4,096 linear word groups, each containing 16 cores, the latter representing 16 digits of a binary word. In FIGURE 1, the word groups are all arrayed in parallel lines in a single plane. For reasons which will become apparent in connection with the discussion of FIGURE 2, below, the 4,096 word groups of cores are organized into 64 planar sub-sets, each containing 64 word groups.

Coupled to each word group in FIGURE 1 there is an individual read selection wire 2 and an individual write selection wire 3, for respectively conveying read selection excitation and write selection excitation to the coupled word group. Disposed cross-wise to all of the read and write selection wires there are a plurality (in this instance 16) of corresponding digit selection wires 5 and sense wires 6. The digit selection wires are each disposed in the usual manner to partially select one digit of every word group during writing of intelligence in a selected word group. The corresponding sense wires serve to pick up signals resulting from excitation of digit storage elements to which they are coupled. During read out, of course, the read selection wire coupled to a selected word group is supposed to be the only wire conveying excitation to the cores, and therefore the corresponding signal on any sense wire is supposed to be representative only of the state of a core in the selected word-group.

The array of FIGURE 1 is shown in the form in which it is usually packaged, in FIGURE 2, the 64 sub-sets being stacked in 64 different planes one behind the other. An interesting point to note with reference to FIGURE 1 is that during read out there are no extraneously excited cores, since only the selected word-group is stimulated, although during writing there are many partially excited cores, namely, all cores in the column associated with a marked digit selection wire. Another interesting point to note is that each sense wire is ordinarily symmetrically coupled to the associated column of cores in such fashion that if the associated column of cores is partially excited during any write interval, the signals induced in the sense wire by magnetic coupling from the digit selection wire and from the extraneously excited cores (i.e. the partially selected cores) are effectively cancelled in the two halves of the sense wire. While this coupling may not seem important because it occurs only during the "write phase" of a memory cycle, in practice it would represent a considerable problem, since if the extraneous signals transferred by the partially excited cores are not cancelled in a large array of the subject type the total coupled signal would become quiet large and its recovery time would thus extend into the subsequent "read" interval and interfere with, or mask, the sensed intelligence signals. Thus it is necessary to have either the above-mentioned cancellation or a longer read-write cycle.

In the wiring system schematically shown in FIGURE 1, which is the ordinary arrangement of wires in word-organized arrays, the digit selection and sense wires are disposed in parallel paths which, in the subject large array, are quite long. Thus, there is extensive inductive and capacitive coupling between proximate digit selection and sense wires. This direct coupling causes the transfer of an unbalanced extraneous signal to the sense wire, upon excitation of the corresponding digit selection wire since the wires are closely coupled throughout their length. The existence of a significant extraneous signal due to magnetic coupling between corresponding digit selection and sense wires has always been appreciated. However, the extraneous signal due to capacitive coupling has apparently been disregarded, although I have observed that the latter signal is quite significant in a large array. In order to explain the effects of extraneous capacitive coupling, it is deemed desirable to first discuss a prior art wiring technique for achieving magnetic cancellation, in connection with FIGURE 3 below, and then to explain the wiring technique shown in FIGURE 4 for magnetic cancellation. The latter technique, although more devious than the former, will then be shown to be a better wiring plan inasmuch as it significantly reduces the extraneous capacitive coupling to the sense wire.

Referring to FIGURE 3, there is schematically illustrated one simple prior art technique for achieving cancellation of extraneous signals due to direct magnetic coupling between corresponding digit selection and sense wires. To aid in identifying the wires, the digit selection wire 10 in FIGURE 3 is represented by thick (heavy) lines while the sense wire 11 is represented by a thin (light) line. The array of cores is schematically represented by the rectangular enclosure 12. To further aid in identifying the digit selection and sense wires, it is noted that the digit selection wire 10 extends further than the sense wire with respect to the upper and lower edges of the rectangle 12. The digit selection wire is excited from a digit signal source indicated at 13.

As shown in FIGURE 3, magnetic cancellation is achieved by reversing the direction of winding of the sense wire, at a point approximately half way through the array, between plane 32 and plane 33, both with respect to the digit selection wire and with respect to the remaining half-column of cores. This being done it may easily be verified that the magnetically coupled extraneous signal currents transferred from the digit selection wire and from the associated cores, to opposite half-segments of the sense wire, defined with respect to midpoint 14 thereof, are approximately equal in magnitude, and of opposite polarities. Hence these induced signals cancel each other. To further aid in identifying the directions of the magnetically induced signals in the various sub-segments of the sense wires coupled to the partial core columns in planes 1 to 64, respectively, each sense wire is provided with a corresponding arrow indication 15. By tallying the arrows 15 of all of the sense wire sub-segments within the array 12, it will be apparent that in the sub-segments which comprise the half-segment associated with planes 1 to 32, inclusive, the arrows 15 point away from the midpoint 14 of the sense wire, and that in the other half-segment associated with planes 33 to 64, the arrows 15 also point away from midpoint 14 but in the opposite direction. Thus, the voltages magnetically induced in one half-segment cancel those induced in the other half-segment.

A modification of the arrangement in FIGURE 3, also for the purpose of achieving magnetic cancellation, is shown in FIGURE 4. While it is not as straightforward as the arrangement of FIGURE 3, the wiring system of FIGURE 4 is of particular interest because it achieves a reduction in extraneous capacitive coupling and also because it represents an intermediate configuration between that in FIGURE 3 and a wiring system to be discussed hereinafter in connection with FIGURE 5, for achieving complete capacitive balance and magnetic cancellation.

Referring to FIGURE 4 the digit selection wire 10 is again represented by a heavy, or relatively thick, line 10, and the sense wire is again represented by a relatively thin, or light, line now identified by the numeral 20. To further aid in identifying the various portions of the sense wire, the letters A and B are used to respectively identify continuous half-segments on opposite sides of the midpoint of the sense wire, the midpoint being indicated at 21 in FIGURE 4. It may also be noted that, for identification purposes only, the sense wire sub-segments 20A have been drawn shorter than both the digit selection wire sub-segments and the sense wire sub-segments 20B, the latter extending the furthest from the upper and lower edges of the rectangle 12. It may further be noted that in FIGURE 4, the A and B sense wire half-segments both enter successive plane of the array at one end thereof (e.g. at planes 1 and 2, respectively; abbreviated $P_1$ and $P_2$, respectively, in the drawing), and they emerge from the last two planes of the array at the other end thereof (e.g. at planes 63 and 64; abbreviated $P_{63}$ and $P_{64}$) where they connect to the midpoint junction 21. The A sub-segments are coupled in sequence to the odd-numbered planes $P_1, P_3, \ldots P_{63}$, and the B sub-segments are coupled in sequence to the even-numbered planes $P_2, P_4, \ldots P_{64}$.

Thus, in the even-numbered planes the arrows 15 all point upwards while in the odd-numbered planes they all point downwards. However, as the directions of successive sub-segments of the sense wire segment A are reversed in successive odd-numbered planes, the associated downwardly pointing arrows 15 are alternately directed towards the end of segment A and the midpoint junction 21, respectively. The result is that there will be 16 magnetically coupled signals of one polarity and 16 signals of the opposite polarity in segment A, this resulting in magnetic cancellation in that segment. By symmetry it is clear that the same will be true of sense wire segment 20B, and thus there will be complete magnetic cancellation throughout the sense wire for the configuration shown in FIGURE 4.

Turning now to the main problem of eliminating the effects of extraneous capacitive coupling between the digit selection and sense wires and referring again to FIGURE 3, the situation in this respect is more complicated due to the fact that in a large scale array of the subject type the lengths of the digit selection and sense wires are considerable. Thus, each of these wires must be treated as having a distributed resistance and inductance along its entire length, and therefore as having a continuously attenuated or diminishing signal along the same length. Assuming for reference purposes that the sense line transformer 7 is grounded as at 24, and assuming further that the digit signal excitation source 13 applies a partial write selection pulse at terminal 25 with respect to the ground at terminal 26, it should be appreciated that the signal on the digit wire will be capacitively coupled to ground at 24 via the distributed capacitance between each pair of corresponding sense and digit wire sub-segments in planes 1 to 64, respectively, and further that the signal between terminals 25 and 26 will be progressively attenuated in the successive sub-segments of the digit selection wire 10. Thus, if the digit selection pulse appears at 25 wtih the initial amplitude V indicated in FIGURE 3, it experiences an average attenuation of, let us say, $e$, in each succeeding sub-segment of wire 10. Hence, in any digit wire sub-segment, for example, that in plane No. $j$, the signal will have an average amplitude of $V-je$. Accordingly, it will be appreciated that the signals capacitively coupled to the sub-segments of the sense wire will all be of the same polarity and therefore they cannot cancel each other. It should also be noted that due to the successive differences $e$, the total capacitively coupled signal in one half of the sense wire will be quite different from that in the other half. More specifically, for the configuration shown in FIGURE 3 the capacitive coupling to ground 24, via the sense wire sub-segments in planes 1 to 32, will be proportional to the sum of the quantities $V-je$, taken over all values of $j$ from 1 to 32, while for those sense wire sub-segments in the other half of the sense wire, the total capacitively coupled signal will be proportional to the sum of $V-je$, taken over all values of $j$ from 33 to 64. Clearly, these two sums will be quite different and a considerable difference signal will be transferred by amplifier 8. In the foregoing the length of the sense wire from the point of capacitive coupling to the ground return at 24 has been neglected in order to simplify the consideration of the inequality resulting from the progressive attenuation of the digit selection signal. Actually, however, this length of sense line should not be ignored and it will be clear from the discussion thereof below that the cancellation techniques demonstrated in FIGURES 4 and 5 also represent optimum configurations with respect to the length of the sense line between the points of capacitive coupling and the ground return at 24.

Referring to FIGURES 4 and 5 it should be clear that the arrangements of digit selection wires and sense wires in the two figures are almost, but not quite, the same. The difference is that in FIGURE 4 the sequence of coupling of sub-segments of the sense wire to successive core planes is A, B, A, B, . . . , through the entire array 12, while in FIGURE 5, the sequence of couplings is A, B, A, B, . . . , through the first 32 planes and then it is reversed to B, A, B, A, . . . , through the remaining 32 planes. The significance of this will become clear from the following discussion.

Analyzing the capacitive coupling in FIGURE 4 in terms of the capacitively coupled signals $V-je$, defined above in the discussion of FIGURE 3, it is noted that the "A" sub-segments of the sense wire in FIGURES 4 receive a total signal via capacitive coupling which is proportional to the sum of the quantities $V-je$, taken over all odd values of $j$ from 1 to 63 while the B sub-segments receive a total signal via capacitive coupling which is proportional to the sum of the quantities $V-je$ taken over all even values of $j$ from 2 to 64. Again it is clear that these two sums will differ, although the difference will be considerably less than that resulting from the configuration of FIGURE 3. In FIGURE 5, however, the reversal in the sense wire sequence, at the midpoint of the array, results in equal summations in the A and B sub-segments. Specifically, the summation of $V-je$ in the A sub-segments is taken over all odd values of $j$ from 1 to 33 and even values of $j$ from 34 to 64, while the summation in the B sub-segments is taken over all even values of $j$ from 2 to 32 and then over all odd values of $j$ from 33 to 63. Thus, a relative deficit of $-16e$, arising in the first parts of the respective A and B summations, is balanced by an opposite difference (i.e. $+16e$) in the latter parts of the respective summations. As a result, the sense wire segments A and B transfer approximately equal capacitively coupled extraneous signals which are, in effect, nullified by the transformer 7 and differential amplifier 8.

It should also be appreciated that not only does this produce optimum magnetic cancellation and capacitive balance, if the sense line coupling distances are neglected, but even taking such distances into consideration, it will be appreciated that since in FIGURES 4 and 5 the A and B sub-segments are alternately coupled in sequence to the consecutive sub-segments of the digit selection wire, any unbalance, which could result from differences in the paths followed by the coupled signals, through the sense line to ground at 24, is minimized.

Another problem attributable primarily to direct capacitive coupling between sense wires and transversely disposed word selection wires, in a word-organized array, is explained with reference to FIGURE 6, and solutions thereof are demonstrated with reference to the wiring schemes shown in FIGURES 7 to 9. Ordinarily, in a large word-organized array of the subject type, it may be inexpedient to provide an individual switch element in series with each word selection wire. Accordingly, all of the word selection wires associated with a planar sub-set of word groups in the array may be connected in multiple, at one side of the array, to a corresponding selection switch 30, as shown in FIGURE 6, and the word selection wires associated with word groups of cores in corresponding word positions in different planes, may be connected in multiple at the other side of the array. Thus, two conditions must be met for selection of any word group of cores. First, a selection signal must be applied to the input end of the word selection wire on the said other side of the array, to select the word row position in all planes, and second, a switch 30 on the said one side of the array must be closed to select one of the planes. It will be appreciated that this arrangement is quite economical since the word selection wires in corresponding word positions are all energized in common and those in the same plane are all grounded in common. This, therefore, represents a form of coincidence selection, but with the coincidence manifested external to the array. That is, the cores themselves do not participate in the selection.

The problem now, as stated with reference to FIGURE 6, is that the voltage generated by the selection current signal intended for selection of a particular row of cores in a particular plane, is impressed, via the multiple connections, on all word selection wires associated with the particular plane, and also on all word selection wires in row positions corresponding to the said particular row. Further, this impressed voltage signal is coupled to all of the transversely disposed sense wires via capacitive coupling at each cross-point. Thus, for any sense wire there are 64 such cross-points, in different planes, due to the row multiple connections and 64 cross-points in each planar sub-segment due to the column multiple connections.

The solution to the coupling problem, as it relates to the configuration of FIGURE 6, is demonstrated in FIGURE 7. The word selection wires connected in multiple to any one of the switches 30, are so selected that the sub-set of wires defined thereby comprises an even distribution of wires relative to the crossing sub-segments of each sense wire disposed as in FIGURE 4 or 5. Thus, the extraneous signal capacitively coupled to the sense wire via any sub-set of multipled selection wires will be substantially balanced between the A and B segments of the sense wire. It is noteworthy that while such capacitive coupling to the sense wires is considerably less than that previously considered in connection with the digit selection wires, the latter being more extensively coupled to the corresponding sense wires throughout the array, the existence of such coupling during the read-out selection superposes a significant noise level on the intelligence being read out, and is, therefore, troublesome.

In accordance with the previous discussion of the attenuation of digit selection signals, and the effect thereof in terms of an unbalance in the extraneous signals capacitively coupled to the sense wire, it is noted that similar considerations apply, although to a much lesser extent, to the wiring plan of FIGURE 7. More particularly the height of a column of 64 cores may become significant, depending on the spacing between rows of the storage array, and therefore, the length of wire traversed by the capacitively coupled extraneous signals will differ by one-half of a plane length. Accordingly, it will prove desirable to further permute the multiple word selection wire connections as shown in FIGURE 8 in order to achieve a more optimum balance.

The lengths of the horizontal paths traversed by capacitively coupled selection signals, along the horizontal bus lines connecting word selection wires in different planes, has been ignored in the above discussion, because the coupling paths in this direction are distributed sequentially, in the same sequence as the digit selection wire in FIGURE 5, to the successive core planes. Thus, there is complete cancellation for a sense wire arranged as in FIGURE 5.

An alternative configuration shown in FIGURE 9 also provides for balanced capacitive coupling between multipled word-selection wires and sense wires. In this configuration, termed the "diagonal mode," sub-sets of word selection wires connected in multiple are systematically grouped in a manner reminiscent of the grouping of elements in the expansion of a determinant. It may easily be verified that the distribution of coupling paths both transverse to the core planes and parallel to the core columns is completely balanced, especially where the sense wires are situated as in FIGURE 5. Here the coupling paths determined by the diagonally disposed multiple connecting bus wires are branched to each core plane in the same coupling sequence as the digit selection wire of FIGURE 5, to thereby provide complete balance. Again, as noted above, the branching coupling paths determined by the horizontal bus wires are also distributed in the same sequence as the digit wire in FIGURE 5, one path per core plane, and are thereby balanced.

As an alternative to the selection arrangement shown in FIGURE 6, it is sometimes desirable to couple an individual selection wire to each storage word-group, and to control each such individual wire with a corresponding individual switch element. This is illustrated in FIGURE 10 wherein an array 40, of switch cores designated SC, is employed to control the access to a storage matrix comprising 64 planes, $P_1$ to $P_{64}$. For reference purposes the word groups of storage elements of the storage array are identified by pairs of integers indicated in parentheses which pairs identify the coordinate locations of the corresponding storage groups relative to the switching core array. Similarly the coordinate positions of the switch cores SC are identified by pairs of subscript integers which indicate the physical locations of these switch cores within the planar array 40. As shown in FIGURE 10 the selection wires assigned to the storage word groups are individually coupled to the correspondingly located switch cores, the selection wires being, therefore, organized into 64 uniform columns of wires, as indicated at 41, in FIGURE 9.

As the switch cores in the array 40 of FIGURE 10 are usually selected by coincident current action, it will be appreciated that upon selection of a switch core, all of the switching cores in the corresponding row and column will be partially excited, and, therefore, all of the word selection wires, issuing from the corresponding row and column of array 40, will bear extraneous excitation which will be magnetically and capacitively coupled in an unbalanced distribution to the sense wires of the storage array.

To avoid such unbalanced extraneous coupling, I have provided a systematic rearrangement of the word selection wires, which is illustrated schematically in FIGURE 11. FIGURE 11 represents an end-on view looking towards the storage cube from the switch core plane 40. To demonstrate the rule followed in the systematic permutation of the selection wires, an arbitrary plane $P_j$ is illustrated, $j$ denoting an arbitrary integer between 4 and 63. In each plane P, the center dots schematically represent word groups of storage cores and the corresponding surrounding circles represent the switch cores in array 40 to which the storage word groups are respectively linked via respective word selection wires. Upon simple inspection it will be noted that all of the center dots (i.e. word groups) in FIGURE 11 are in the same positions as the corresponding word groups in FIGURE 10, and again with reference to FIGURE 10, that the selection wires, in each row in FIGURE 11, have been displaced by a different number of column positions, modulo 64.

Thus, in the first row there is no relative change in the word selection wire organization. In the second row all selection wires are shifted one column position (modulo 64) relative to the associated row of switch cores. In the third row the selection wires are all shifted two column positions (modulo 64) relative to the third row of switch cores, and so forth. Thus, in general, the selection wire coupled to word group position $(i, j)$ is also coupled to switch core $SC_{i,\overline{j-i+1}}$ where the overscoring over the second coordinate subscript is to be understood to denote "modulo 64." Thus, the selection wire coupled to the 64th word-group position $(64, j)$ in plane $P_j$, is also coupled to switching core $SC_{64,j+1}$, since $j-64+1$ (modulo 64) is equal to $j+1$.

It will be clear to those skilled in the art that the example shown in FIGURE 11 represents one of many alternative procedures for systematically rearranging the relative positions of the selection wires 41 of FIGURE 10 so as to balance the extraneous coupling due to extraneous excitation of the switch cores.

It should further be understood that all of the other specific examples discussed above in connection with FIGURES 4, 5, and 7 to 9 are equally susceptible of numerous permutations within the scope of the invention. Accordingly, it is to be understood that the invention is limited only by the spirit and scope thereof, as stated in the above objects and in the following claims.

Accordingly, I claim:

1. In combination with an array of bistable storage elements arranged in a succession of linear word-groups for single wire read out selection a wiring system for achieving a balanced distribution of both magnetic and capacitive coupling between selection and sense wires associated with said array, comprising:

an array of switching elements positioned in correspondence with said word-groups;

a plurality of sense wires each organized into interconnected first and second continuous segments of approximately equal length, the first and second segments being further organized into respective first and second chains of successively connected sub-segments directed in sequence from the free ends of said respective segments to the junction thereof, said sub-segments of the said respective chains being alternately coupled in said directed sequence to respective linear sub-sets of storage elements disposed cross-wise to the lines defined by corresponding sub-sets of word-groups of said array, each said sub-set of elements consisting of one digit storage element from each word group in said corresponding sub-set of word-groups; and a plurality of word selection wires individually coupled between respective ones of said word-groups of storage elements and associated ones of said switching elements in a systematically permuted sequence, the connections from a given row of the array of switching elements forming the group and the connections from successive groups being permuted such that all word selection wires which are extraneously excited during excitation of a selected one of said switching elements, are distributively coupled in equal degrees to the first and second segments of each said sense wire.

2. A wiring system according to claim 1 wherein: said systematically permuted sequence comprises the coupling of all word selection wires associated with a column of said switching array, to different linear sub-sets of storage elements as defined with respect to said sense wires.

References Cited

UNITED STATES PATENTS

| | | | |
|---|---|---|---|
| 2,897,482 | 7/1959 | Rosenberg | 340—174 |
| 3,076,958 | 2/1963 | Pohm | 340—174 |
| 3,110,017 | 11/1963 | Thornton | 340—174 |
| 3,134,163 | 5/1964 | Luhn | 340—174 |
| 3,149,313 | 9/1964 | Merz et al. | 340—174 |
| 3,161,860 | 12/1964 | Grooteboer | 340—174 |

JAMES W. MOFFITT, *Acting Primary Examiner.*

BERNARD KONICK, *Examiner.*

M. S. GITTES, *Assistant Examiner.*